(12) United States Patent
den Besten

(10) Patent No.: US 11,432,238 B2
(45) Date of Patent: Aug. 30, 2022

(54) TRANSCEIVER-BASED HANDSHAKE/POWER-REDUCTION

(71) Applicant: NXP B.V., Eindhoven (NL)

(72) Inventor: Gerrit Willem den Besten, Eindhoven (NL)

(73) Assignee: NXP B.V., Eindhoven (NL)

( * ) Notice: Subject to any disclaimer, the term of this patent is extended or adjusted under 35 U.S.C. 154(b) by 86 days.

(21) Appl. No.: 16/827,525

(22) Filed: Mar. 23, 2020

(65) Prior Publication Data
US 2021/0282087 A1 Sep. 9, 2021

Related U.S. Application Data

(60) Provisional application No. 62/984,905, filed on Mar. 4, 2020.

(51) Int. Cl.
*H04W 52/02* (2009.01)
*H04B 1/401* (2015.01)
*H04W 24/08* (2009.01)

(52) U.S. Cl.
CPC ........ *H04W 52/0206* (2013.01); *H04B 1/401* (2013.01); *H04W 24/08* (2013.01)

(58) Field of Classification Search
CPC ... H04W 52/0206; H04W 24/08; H04B 1/401
See application file for complete search history.

(56) References Cited

U.S. PATENT DOCUMENTS

| | | | | |
|---|---|---|---|---|
| 7,127,638 B1* | 10/2006 | Sardella | ............... | G06F 11/1441 714/15 |
| 2006/0233193 A1 | 10/2006 | Ungermann et al. | | |
| 2009/0325508 A1* | 12/2009 | Cho | ....................... | H04W 99/00 455/74 |
| 2011/0007733 A1* | 1/2011 | Kubler | ................... | G06F 1/1626 370/352 |
| 2014/0050273 A1 | 2/2014 | Rao | | |

(Continued)

OTHER PUBLICATIONS

"Open Alliance TC10 Sleep/Wake-up Capable PHYs", NXP Semiconductors, 1 pg., retrieved from the internet Jun. 29, 2021 at: URL:https://www.youtube.com/watch?v=XAucD4_BROnM (Apr. 30, 2019).

(Continued)

*Primary Examiner* — Dady Chery

(57) ABSTRACT

Exemplary aspects are directed to transceivers interlinked in a communication system, for example, in respective circuit-based nodes installed in battery-operated vehicle or other apparatus. Representative of the communication system are a first transceiver and a second transceiver which communicate with one another over a communication link, with the first transceiver initiating a request over the link to the second transceiver. The second transceiver may receive the request and, for a period of time in response to receiving to the request, monitor the link to detect whether any further signaling on the link by the first transceiver indicates to accept the request. In certain other more specific examples, the above aspects are used as part of a handshake protocol to mitigate delays and related issues in coordinating timely actions associated with the request.

23 Claims, 9 Drawing Sheets

(56) References Cited

U.S. PATENT DOCUMENTS

2018/0092093 A1* 3/2018 Ramaswamy ........ H04W 28/16
2019/0116019 A1* 4/2019 Chu ..................... H04L 5/1438

OTHER PUBLICATIONS

Axer, Dr. P et al. "OPEN Alliance TC10 Sleep and Wakeup the Way from 100BASE-T1 to 1000BASE-T1 Capable PHYs", NXP, 33 pgs., retrieved from the internet Jun. 28, 2021 at: URL:https://assets.vector.com/cms/content/events/2019/vAES19/vAES19 -02 -Sporer -NXP.pdf (May 5, 2019).

Axer, P. et al. "OPEN Sleep/Wake-up Specification Sleep/Wake-up Specification for Automotive Ethernet", NXP, 17 pgs., retrieved from the internet Jun. 28, 2021 at: URL:http://www.opensig.org/download/docume nt/220/TC10%20Wake-up%20and%20Sleep%20Spec ification%20for%20Automotive%20Ethernet_11-2017.pdf (Feb. 25, 2017).

* cited by examiner

TRANSCEIVER-BASED HANDSHAKE/POWER-REDUCTION

Aspects of various embodiments are directed to transceiver-based communications for coordinating actions, such as power-level control, over a channel or link between the transceivers.

Many communications systems implement power-reduction protocols to save on power consumption. As an example, power-reduction protocols are important for systems that operate using a battery as a source of power. Consider battery-powered portable communications systems (e.g., vehicles) in which circuit nodes (e.g., configurable chips, microcomputers and other types of logic circuits) are distributed throughout and are implemented with the various nodes working together but with each acting relatively-independently on its own while expecting that the other nodes are carrying out their related activities as conveyed using such protocols. For many such applications including those concerning vehicles, it is important that the communication protocols used by these nodes are timely and reliable. This follows as such protocols may be associated not only with effecting control of power at the nodes (e.g., implementing power reduction levels) but also other operations such as those occurring after a node would power up and begin to sharing control and/or load data.

Certain automotive applications exemplify use of such communication protocols with transceivers at respective nodes exchanging wake-up and sleep request messages over an Ethernet link to reduce power levels consumed at each transceiver-based node (low power, sleep mode, etc.). For example, a sleep request may be from one transceiver to another transceiver by a low-power-signaling (LPS) message, as signaled by operating or sending a modified idle sequence sent for a certain amount of time. Once asleep, a wake-up instruction to the transceiver(s) may occur over another active link to one of the asleep transceivers by way of a wake-up remote (WUR) message. The WUR message may be signaled by another idle sequence sent over the link for a certain amount of time. Finally, another type of wake-up request may occur while the link is silent and/or transceivers are asleep; this request may be conveyed by a Wake-Up Pulse (WUP) message. In one such automotive protocol specified by OPEN alliance/TC-10 wake-sleep protocol ("TC-10 specification") for automotive Ethernet transceivers, the WUP message is implemented as a standard idle sequence and is recognized by the linked (partner) transceiver as link activity.

Depending on the applications at hand, other handshake issues may arise in connection with such protocols. For instance, consider that a transceiver may initiate a sleep request by transmitting an LPS message and, in response the transceiver may or may not receive an LPS message within a time-out period. In the case where the LPS message is received, as intended both transceivers agree to go to sleep and become silent (e.g., further communications between the transceivers ceases). In the latter case, however, because the LPS message is not received within a time-out period, the sleep request fails and the link may stay operational or, if the other transceiver did respond with LPS but it was not detected, that transceiver might perform an erroneous operation based on the wrong assumption as to the operation status of the other transceiver and the link may go down and have to be restarted. Such a situation may occur in example protocols set forth in accordance with the OPEN TC-10 specification.

Accordingly, the reliability of many such communications systems may be dependent on proper communications by each of the transceivers sharing such a link, and failure in any of these regards can lead to problems with power savings and/or link down time. Further, for certain implementations using protocols set forth in the OPEN TC-10 specification, for a transceiver (which has initiated a sleep request) to abort a sleep request, it can take an excessive amount of time and this ability also can fully depend on the response of the link partner. If the link partner confirms the sleep request but the initiator already received a wake-up, it still would have to wait for the link partner response time plus the link retraining time before the link is operational again. In some instances, this wait period might be more than 100 ms.

In accordance with the present disclosure, various examples are directed to example embodiments and may be useful for addressing issues such as those above in connection with systems pertaining to aspects of the TC-10 standard as well as other issues as may be apparent from the following disclosure. According to the present disclosure, one such example embodiment concerns a communication link between at least two circuit-based nodes, two of the nodes respectively include or are implemented using a first transceiver and a second transceiver. The first transceiver is configured to initiate a request (e.g., an activity-related request) over the link to the second transceiver. In response to detecting the request, the second transceiver configured to monitor the link for a short period of time and depending on what further signaling from the first transceiver, if any, is detected on the link during this time, the second transceiver assesses whether to accept or reject the request.

In more specific embodiments consistent with the above example, a handshake protocol is used by the transceivers. The first transceiver sends the initiating request to the second transceiver and, by using such further signaling or lack thereof in accordance with the protocol, the first transceiver can choose to permit the second transceiver to act on the request upon termination of the short period of time or may abort the request. For example, the first transceiver may effect such an abort action by sending another message up to the time that the other transceiver has accepted and/or begun to act on the request.

In either instance, the first transceiver controls any action taken on the request by the second transceiver until the short period of time expires, thereby permitting both transceivers to carry out any activities related to the request in a coordinated manner.

In connection with yet further specific examples, the present disclosure is directed to use the above-discussed aspects for wake-sleep protocols, thereby effecting power-reduced modes of operation and/or waking-up from such power-reduced operational modes. In more specific embodiments of this type, such specific examples are at least partially (or completely) compliant with the above-noted TC-10 standard in which wake-up remote (WUR) messages and wake-up pulse (WUP) messages are sent over the link.

In yet other specific embodiments, one or both of the first and second transceivers are configurable so as to operate with or without aspects or improvements as disclosed herein, thereby being backward compatible for operations as in a convention transceiver operating such as in accordance with the published TC-10 standards.

The above discussion is not intended to describe each embodiment or every implementation of the present disclosure.

Various example embodiments may be more completely understood in consideration of the following detailed description in connection with the accompanying drawings, in which.

Figure 1A:
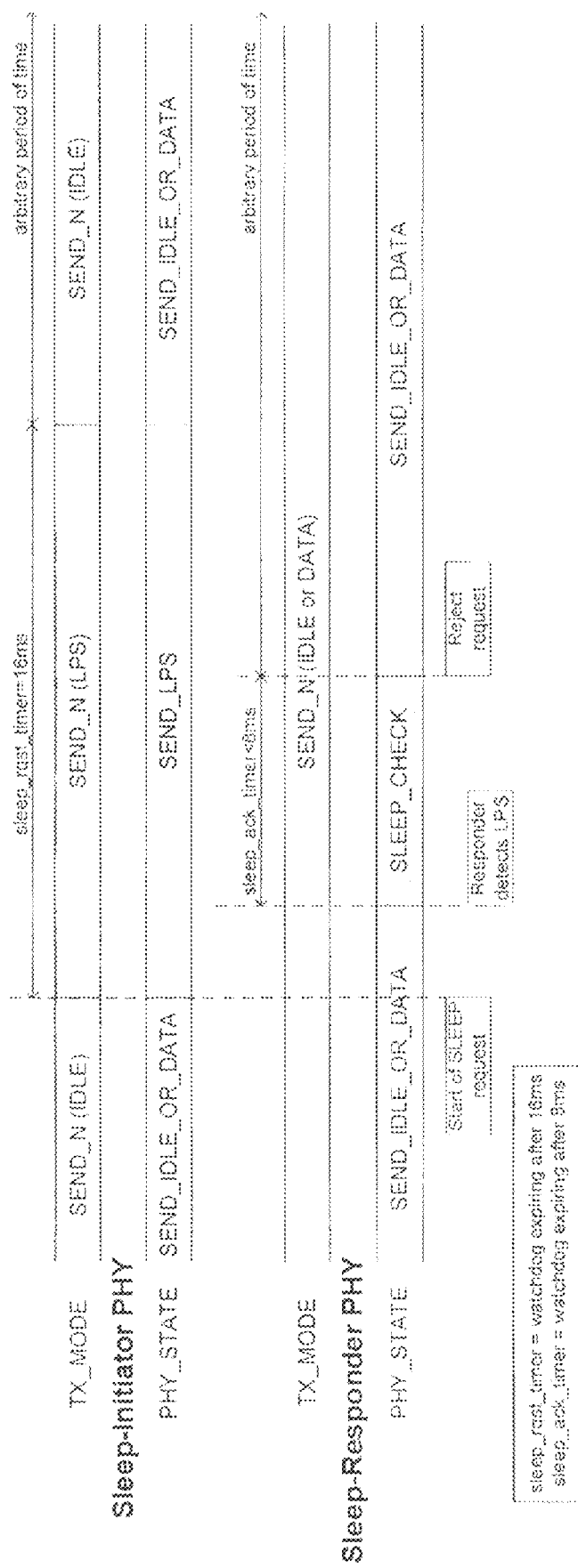
FIGS. 1A and 1B are state diagrams presenting certain exemplary aspects of the present disclosure, corresponding to respective situations involving a request from an initiating transceiver to another (responding) transceiver, where the request is not accepted as in FIG. 1A, and where the request is accepted as in FIG. 1B.

While various embodiments discussed herein are amenable to modifications and alternative forms, aspects thereof have been shown by way of example in the drawings and will be described in detail. It should be understood, however, that the intention is not to limit the disclosure to the particular embodiments described.

Aspects of the present disclosure are believed to be applicable to a variety of different types of apparatuses, systems and methods involving use of a plurality of transceivers which are linked for communications to coordinate activities (e.g., controlling power-consumption levels) efficiently and reliably. While the following discussion uses power-level control protocols for automobile-based communication systems as an exemplary context to help explain such aspects, the present disclosure is not necessarily so limited.

Accordingly, the present disclosure provides various specific examples with aspects and related details for discussion purposes. It should be apparent to one skilled in the art, however, that one or more other examples and/or variations of these examples may be practiced without all the specific details provided herein. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In specific examples according to the present disclosure, certain embodiments are directed to a method for use in a communication system having a request-initiating transceiver being communicatively coupled for communication via a link. The method includes use of another transceiver in the communication system, wherein the other transceiver receives a request over the link from the request-initiating transceiver. In response, the other transceiver monitors the link for a period of time to detect if any further signaling on the link from the request-initiating transceiver indicates that the request is to be accepted. In more specific examples, the other transceiver is to accept the request in response to said any further signaling being in compliance with a handshake protocol, wherein the other transceiver is to interpret said any further signaling of a certain type (e.g., as specified in the protocol) as a request to abort the request from the request initiating transceiver. The initiated request may be a request to transition respective states of the first and second transceivers for alignment (e.g., to message an instruction to sleep, wake up, or enter a high-alert condition), and the aforesaid any further signaling indicates that the first transceiver has already transitioned for the alignment. In certain other more specific examples, the above aspects are used in as part of a handshake protocol to mitigate delays and related issues in coordinating timely actions associated with the request.

Other exemplary aspects are directed to transceivers interlinked in a communication system, for example, in respective circuit-based nodes installed in battery-operated vehicle, with each of the transceivers being part of a circuit node configured to communicate with the other circuit nodes by sending communications between the nodes as messages according to a communications/handshake protocol. Such systems in accordance with the present disclosure may include a first transceiver and a second transceiver which communicate messages, such as power-down and power-up, with one another, over a communication link. With the first transceiver initiating a request over the link to the second transceiver, such messages are susceptible to being implemented at the wrong time and/or in dynamically-changing situations (e.g., as described earlier in the present disclosure). To avoid/mitigate such undesirable situations, the second transceiver may receive the request and, for a period of time in response to receiving to the request, monitor the link to detect whether any further signaling on the link by the first transceiver indicates to accept the request. In more specific examples, this type of power-level control instruction may be sent to one or more of multiple nodes in the system for ensuring that by sending a request for a transceiver to take action based on such an instruction, the other nodes can rely on the transceiver receiving the request to proceed by taking action on the request without undue delay or mishap.

In connection with the above aspects and examples, such delays and/or mishaps may be appreciated by certain aspects of the present disclosure which have been found to benefit communication systems in which power-reduction protocols are used to forward wake-up events for each node of the system. Accordingly, in connection with the present disclosure, a type of problem has been discovered for such systems in that significant delays occur when forwarding wake-up events by signaling between the nodes, for example, as indicated in the TC-10 standard. In such an example, if a wake-up message for a needed event were to be received by a transceiver when this transceiver has just started sending lower-power signals (LPS) to another transceiver, significant delays might ensue by an expected implementation according to the TC-10 standard. Such an implementation would have the sleep request procedure completed first in order to bring both transceivers into the sleep mode, followed by a wake-up signal or pulse sent over the link (WUP); this results in a significant amount of time being lost before the relevant nodes implemented the requested wake-up. Unfortunately, this situation has been found to occur for such an implementation following the TC-10 current standard. Sending LPS is seen as the point-of-no-return and the link goes to sleep unless the link partner does not accept the request. This wake-sleep request conflict can occur in a normal communication environment as wake-up events can come from multiple sources and a transceiver and/or controller (e.g., master control unit or MCU having logic circuitry) might not be aware of the situation and/or configured to address it. Also, a transceiver with auto-sleep functionality may autonomously decide to request sleep after observing a certain maximum period of idle on the link. That might happen just before the link is needed again for data.

In connection with certain aspects of the present disclosure and consistent with the discussion of the above examples involving such linked transceivers operating with such handshake signaling, the above problematic scenarios may be overcome. According to one approach as an example for addressing such situations, the sleep request by the initiating transceiver by may be aborted while the responding transceiver is involved in LPS. In many cases, this avoids the link going asleep and so that the link may continue to be used for data transmissions. This above approach is also consistent with the TC-10 specification, and by configuring certain control registers in one or more of the transceivers, such steps to carry out this approach may be enabled or disabled.

Also, in the situation where a transceiver that has started transmitting LPS (either as sleep initiator or responder), and the transceiver receives a wake-up request while its link partner is not silent yet, it will start sending WUR instead of LPS (differently modified idle sequence). This may result in any of various situations such as those that follow. In one situation, the second transceiver (e.g., "link partner") is to be a responder to a sleep request but has not detected LPS yet, and it detects a WUR (wake-up remote) over the channel via a (e.g., wired) link or another channel. The WUR is forwarded and operations via the link continue as if there was no sleep request. In another situation, the link is to be a responder, which has detected LPS, and was in a check state to decide whether to accept the sleep request or not, when it detects WUR. The WUR is interpreted as a sleep abort request, and the WUR is forwarded as if there was no sleep request. In another situation, the link partner is to be a sleep responder, and it may have detected LPS, and responded LPS, but was waiting for the sleep initiator to go silent when it detects WUR. The WUR is interpreted as a sleep abort request, and the WUR is forwarded as if there was no sleep request. In another situation, the link partner is to be a link partner is sleep initiator and did not successfully detect LPS from its partner transceiver (the responder) yet; however, it then detects WUR and interprets this as a sleep abort request, and the WUR is forwarded as if there was no sleep request. In each of these situations, the system may be conforming with all or part of the TC-10 specification, and the transceiver will remain operational and not enter sleep. According to present disclosure, failure of the abort may be prevented/mitigated by configuring the transceiver(s) such that the sleep responder waits for the sleep initiator to go silent before going silent itself, thereby providing a more reliable handshake between the link partners.

Two other situations result in attempted aborts of the sleep request but with the attempts failing. In a hypothesized situation of this type, the link partner is a sleep responder, has detected LPS, is not waiting for the sleep initiator to go silent, and become silent; this leads to the attempted abort of the sleep request failing, and the wake-up request being stored and serviced with a WUP when the link enters sleep. In the second situation of this type, the link partner is a sleep initiator, has detected an LPS response from the other transceiver, and goes silent before detecting WUR; this lead to failure of the sleep request abort, the wake-up request is stored and serviced with a WUP when the link enters sleep.

For such situations in which there is a wake-up during SEND_LPS by a sleep initiator, success would be more likely realized if the transceiver(s) is/are configured such that the sleep responder waits for the sleep initiator to go silent before going silent itself. It has been shown using communications systems conforming to this aspect, that for the sleep initiator situations a wake-up sleep request abort is successful in one-hundred percent of such occurrences. For a wake-up event during SEND_LPS of the sleep responder, with only one of two cases succeeding, another aspect of the present disclosure recognizes that the problem may arise only during a short time from start sending LPS until the link partner can detect the LPS.

According to certain methods and apparatuses of the present disclosure, the sleep request abort by wake-up is more relevant for the sleep initiator than for the sleep responder. The sleep initiator needs to take the decision that it wants to go to sleep much earlier than the sleep responder. Furthermore, the transceiver does not know if and when the link partner will accept such a request. After receiving the sleep request, the sleep responder has significant time to check if it will accept the sleep request or reject it. When it starts sending LPS the link is only a limited number of symbols (less than or equal to 128 symbols per the TC-10 standard) away from the point-of-no-return in that both transceivers on the link will go to sleep. According to aspects of the present disclosure, however, the sleep initiator is provided opportunity to abort the sleep request until the same point in time as the sleep responder's point-of-no-return.

In the above and other specific situations and examples which may use such requests for power-level control instructions, aspects of the present disclosure are directed to the first transceiver being configured to initiate a request to change a state of operation (e.g., relating to operational speed, enabled functionality and/or power consumption) by sending a request message across the link, and in response the second transceiver assessing whether and/or when to comply based at least in part on sensing that the first transceiver has signaled (e.g., via link or another channel) conformance with the request to change the state of operation. In certain more specific examples, the initial request message may be a sleep request/instruction, and the second transceiver may have indicated acceptance but waits for ensuing further action in compliance with the request until it senses that the first transceiver has ceased to send certain signals to the second transceiver. In yet further specific examples, during the certain period of time beginning the initial request is received/sent over the link, the first transceiver may abort the request using the link between the transceivers in multiple ways including as examples: by signaling certain data, not sending certain signals and/or sending modified idle signals over the link as may be specified in the protocol used by the first and second transceivers; and/or by using a secondary or back channel to convey one or more of the above type of signals (and/or to convey absence of such signals).

Figure 1B:
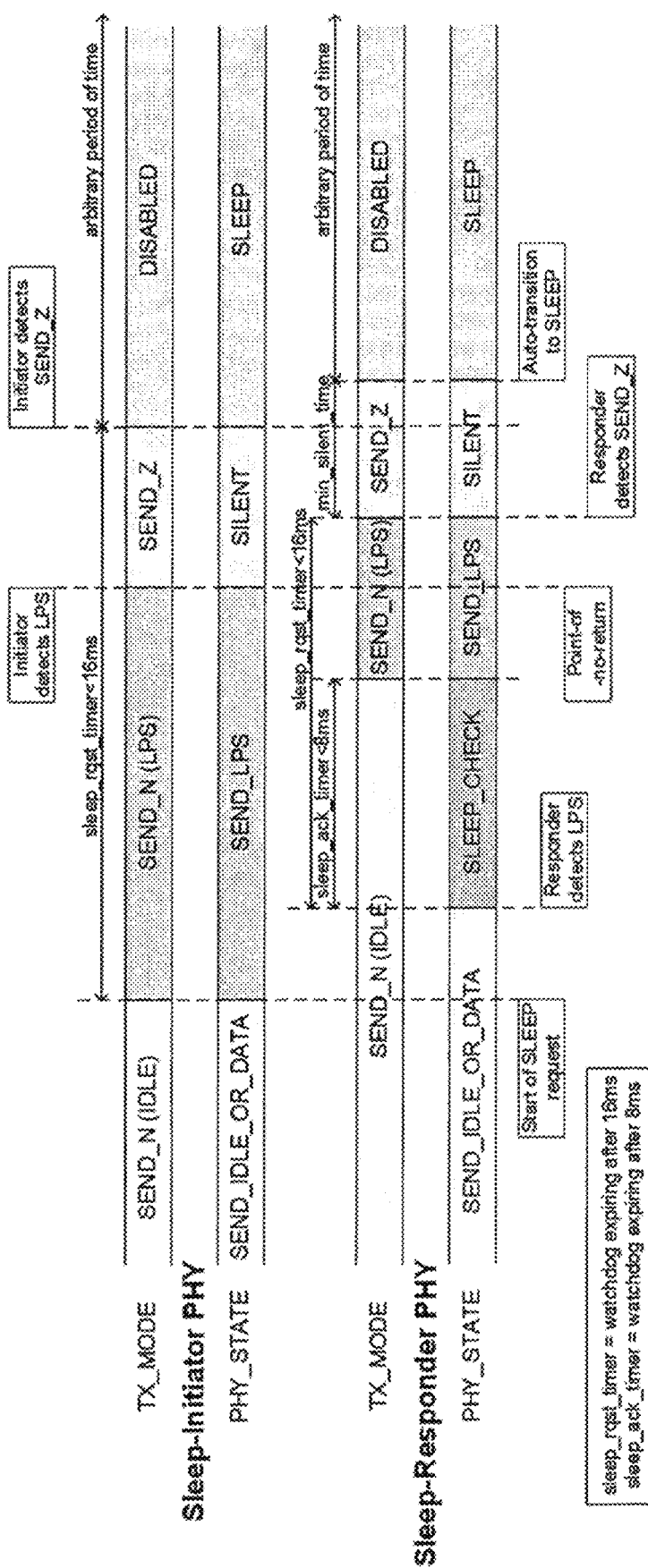
Figure 1C:
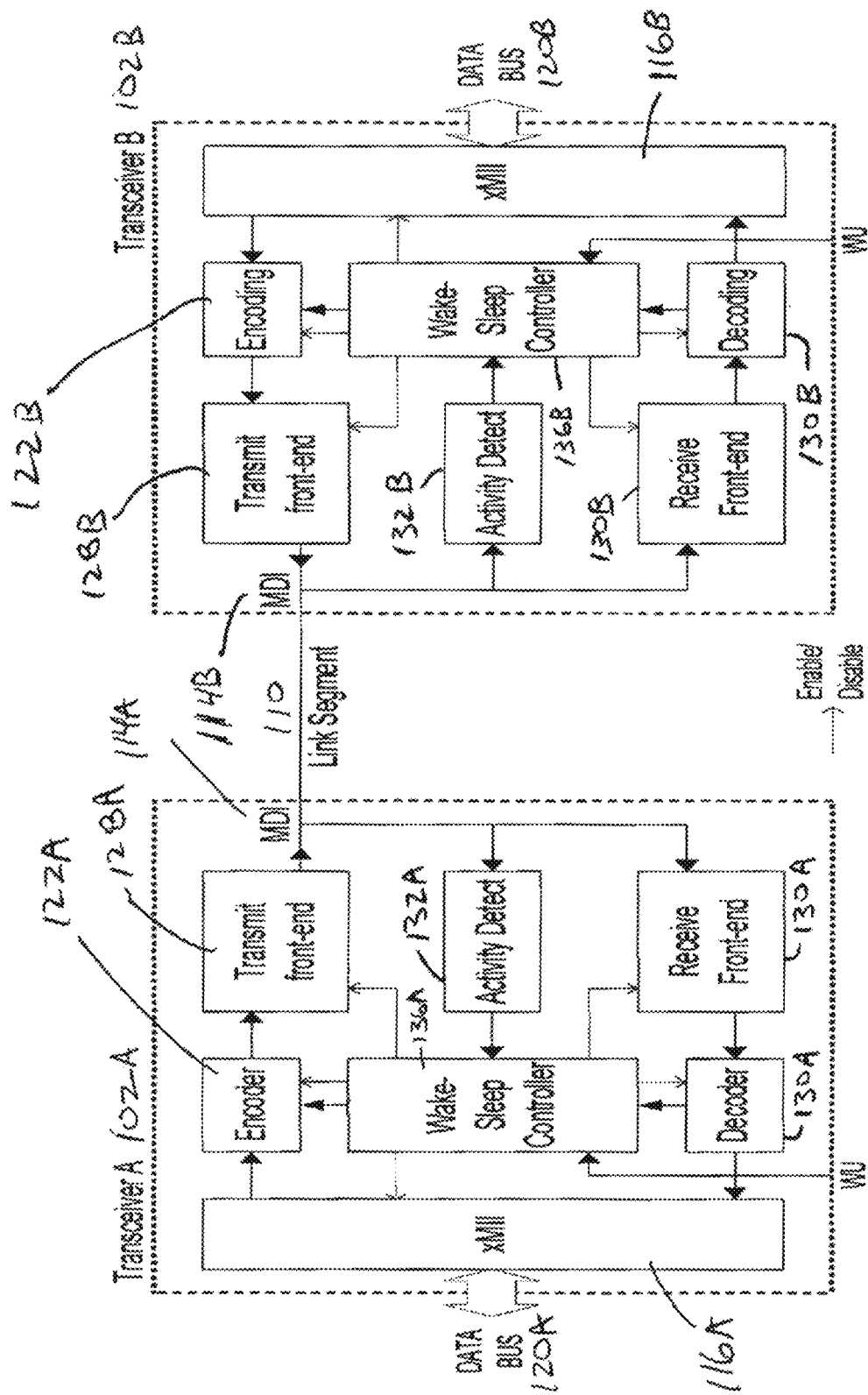
FIG. 1C illustrates a block diagram, according to the present disclosure, showing one example of how such transceivers depicted in FIGS. 1A and 1B may be implemented.

Turning now to the drawing and relating to the above-disclosed aspects and embodiments, the diagrams of FIGS. 1A and 1B are used to illustrate aspects of the invention exemplified by the example communication system of FIG. 1C which shows certain types of circuits, including a first transceiver 102A and a second transceiver 102B arranged to implement a communication protocol, or handshake protocol, by sending signals over the link 110. The circuits depicted in blocks of FIG. 1C may be implemented using shown exemplary logic circuitry as example of a system in block diagram form, comprising two transceivers that would be useful to support apparatus claims. Such logic circuitry may be implemented, for example, using any of various forms or combinations of digital and/or analog circuitry, semi-programmable circuits, microcomputers, etc. It will be appreciated, however, that other type of circuits may also be used.

More specifically, in the example system of FIG. 1C, the transceivers 102A, 102B with the interconnecting link 110 being one exemplary way to implement a data/signaling link, as a communication path or channel. The transceivers 102A, 102B may be part of a (larger) transceiver-based system, such as with each transceiver being a circuit-based node, with each such node being linked to at least one of the other nodes via at least one link or other data/signaling channel. In these contexts, the data/signaling channel(s) may be used for data/signaling between such transceivers pursuant to handshake steps that, in accordance with present disclosure, mitigate and/or prevent unintended anomalies and delays. As one example, such handshake steps permit for high-reliability in carrying out the transceivers' coordinated or aligned state transitions involving wake-sleep modes of operations.

Turning now to the particulars of shown in the example of FIG. 1C, the exemplary link 110 may be implemented using any of various forms such as an unshielded twisted pair, a shielded twisted pair, coax, or fiber. As the blocks within each of the transceivers 102A, 102B are depicted using corresponding reference numerals, each transceiver includes a media-dependent interface (MDI circuit) 114A, 114B on the line-side connection to the link 110 and a media-independent interface (xMII circuit) 116A, 116B connected to a controller or host device (not shown) to be connected to a data bus 120A, 120B. There are several xMII variants, including MII, RMII, RGMII, SGMII, USXGMII, each of which provides either a parallel or serial data connection and, therefore, any such variant may be used in such a transceiver-based circuit arrangement between a controller and a transceiver (which are often sufficiently proximate one another to avoid problems typically associated with low signal-noise and signal delay issues). Additionally, one or both of the exemplary transceivers 102A, 102B may include a management interface (not shown) for selective configuration of the transceiver. Data delivered by a controller via xMII 116A, 116B is encoded (e.g., scrambling, block coding, and/or line coding) by an encoder 122A 122B and driven on the link 110 by a transmit front-end circuit 128A, 128B which includes a line driver (not shown) and which translates digital information into line signals. The signal transmitted by the link partner (e.g., transceiver 102B for 102A) is received, recovered, and converted to digital information by a receive front-end circuit 130A, 130B, and this digital information is decoded and delivered to the controller via xMII 116A, 116B. Note that a transceiver may be included in a larger integrated circuit, like a switch, in which case the connection between transceiver and controller may become an internal interface. As further discussed below in connection with the illustrated state diagrams and handshake protocols consistent with the present disclosure, each transceiver 102A, 102B may use an activity detector 132A, 132B and a wake-sleep controller 136A, 136B, the latter of which may respond to the activity detector 132A, 132B monitoring activity on the link (e.g., data/signaling conveyed between transceivers for request and to indicate an operational state of the link). The activity detector, in certain specific embodiments, may be used only for detecting WUP when the link is in SLEEP. Note that the wake-sleep controller may also be connected to the encoder and decoder to generate and detect particular signaling sequences. As one example, signaling on the link may be used to transition between sleep-wake up modes of a transceiver.

While not a requirement for all transceivers and transceiver-based systems using aspects of the present disclosure, the link 110 of FIG. 1C may be a shared medium for transmit and receive, and the transceivers 102A, 102B may be configured to operate in full-duplex, in which case, a hybrid function and echo cancellation may be used in the receive path to isolate the received signal from the composite transmit/receive line signal. For the following discussion, this type of arrangement and configuration may be assumed for an appreciation of certain aspects of the present disclosure as may be applied, for example, to certain of the illustrated state diagrams as may be used with different protocols such as those specified in BASE-T1 standards (e.g., using full-duplex via a link form via a single twisted-wire pair). It will be appreciated, however, different types of links (or channels) may also be used in connection with such transceiver-based operations and may include separate transmit and receive paths.

With reference to the type of arrangement and configuration as discussed in connection with exemplary contexts as in FIG. 1C, if there is no data available to be transmitted, the link may be deemed idle. This idle condition or state may be indicated with a transmitter sending a pattern to maintain synchronization between the transceivers. As there is a power cost for such idle signaling via the link even when data is not being sent, if idle signaling is being used to maintain the link in an idle mode (in the absence of sending data) for longer periods of time, in certain example embodiments, both transceivers may be put into a sleep mode to save power, with the opportunity to wake-up the link partner via the link segment when needed. It is not necessary that the transceivers have predetermined sleep-initiator or sleep-responder roles; rather any transceiver may initiate a sleep request. The same applies for wake-up, and therefore wake-up and sleep requests may come from different transceivers. However, a system might be configured such that sleep requests are only used in one link direction. One benefit of such a restriction is that the situation with two simultaneous sleep initiators cannot occur. As discussed previously, an initial request sent over the link may be used to effect the sleep mode and a counter-acting request such as wake-up. In such discussions of examples, it is appreciated that such sleep-wake requests may be used for effecting different levels of power consumption (e.g., full power and varying levels of less than full power).

Certain more-specific example embodiments may conform both to the TC-10 specification and to the operations depicted via the state diagrams and circuitry of FIGS. 1A, 1B and 1C. As an example of aspects of the present disclosure being compatible with conventional protocols, reference is made to the TC10 wake-sleep specification for Automotive Ethernet as one such conventional protocol, and one which also sets forth transceiver-based operation in compliance with 100BASE-T1. Even for environments or perspectives in which an implementation of the TC10 specification is not 100% compliant with the 100BASE-T1 specification, to avoid interoperability issues, transceivers may be configured to support TC10 or not. This standard specifies slightly modified idle sequences called Low-Power Signaling (LPS) and Wake-Up Remote (WUR) to enable handshake messages for wake-up and sleep across the link during normal operation. With reference to either transceiver 102A, 102B of FIG. 1C, the wake-sleep controller 136A, 136B may instruct the encoder 122A, 122B to modify the idle sequence for LPS or WUR and may receive an indication for LPS or WUR from the decoder 130A, 130B when such sequences are received. The wake-up controller 136A, 136B disables selective blocks/circuitry of the transceiver 102A, 102B when the wake-up controller enters the sleep state. In certain examples in which such the transceiver has multiple power supplies/sources (e.g., multiple battery circuits), certain (power) supplies may be disabled. In certain more specific examples of this type, only an activity detector (to monitor activity on the line) and the wake-sleep controller remain active.

A local wake-up event via a Wake-Up (WU) to the wake-sleep controller 136A, 136B may initiate a process to bring the link back to normal operation. This may begin with re-establishing power for the local (or request-initiating) transceiver if it was powered down. Then the local transceiver may transmit a Wake-Up Pulse (WUP) on the link 110, which in this case may be a period of an idle sequence on the link. The activity on the link may be detected by the activity detector 132B or 132A of the respective transceiver link partner 102B or 102A.

As the sleep state is also indicated to the associated wake-sleep controller 136A, 136B, the WUP signal may be relatively slow in order to enable low-power consumption for the activity detector 132A, 132B. The wake-sleep controller may convey/trigger that the power supplies of the link partner are re-established if they were powered down. Next the transceiver which is master of the link (which may be set by configuration or by auto-negotiation) may start a training process for the transceivers. Implementations for such training and retraining are known and not overly pertinent to the noted aspects of the present disclosure. For further information, however, reference may be made, for example, to the standard set forth in 802.3bw 100BASE-T1. Although link training takes some time, the wake-up event is already communicated to the link partner through the WUP, which can be forwarded on other ports to other devices. In other examples, note there may be multiple Wake-Up (WU) sources for a transceiver, for example, via a pin on the integrated circuit (IC), a register bit, and/or a wake-up received on another port of the device.

Using this above example context of FIG. 1C, the state diagrams of FIGS. 1A and 1B may be used to understand aspects of the present disclosure. One such aspect is exemplified using, as the initial request over the link, a sleep request. The diagrams of FIGS. 1A and 1B show what may happen: when the transceiver targeted by the sleep request (responder) rejects the sleep request and as a consequence, the intended (sleep) mode does not occur; and when the responder does not reject but rather accepts the sleep request and transitions into the sleep mode associated with the request.

In this example and applicable to both FIGS. 1A and 1B, the transceivers may use communications over the link to enter a sleep state through a sleep request procedure. The sleep request procedure may be initiated by one of the transceivers, denoted as sleep initiator, with the link partner (referred to as sleep responder) either rejecting (FIG. 1A) or accepting the request (FIG. 1B). The procedure may commence, for example, by the sleep initiator transmitting LPS during idle time. The sleep responder recognizes the LPS, responds by indicating the LPS to the associated sleep-wake controller (e.g., 136A), which may then interpret the LPS as a sleep request. Once the LPS is so interpreted, the sleep-request responder (e.g., transceiver 102B) is provided some time to consider the request and decide whether or not the request should be accepted for action. This consideration time may be a state of operation, referred to as SLEEP_CHECK state.

In a specific example implementation, the SLEEP_CHECK state is bounded by a watchdog timer (e.g., sleep-ack-timer), and the responder (e.g., transceiver 102B) may indicate this request to a controller on the other side of the xMII interface, containing the MAC and possibly other layers of the communication protocol controller via an interrupt, so that the controller can decide if the request should be accepted or rejected, and communicate this to the transceiver via a management interface. The transceiver may also be configured so that the transceiver's wake-sleep controller decides autonomously on sleep requests. In another example, the request is forwarded to another module, which may be internal or external to the transceiver, for deciding whether to accept or reject. These options may also be configurable via a management/register interface. According to such aspects of the present disclosure, during SLEEP_CHECK state the link may stay in normal operation.

It is noted that according to the TC-10 standard, the sleep request would be auto-accepted by the sleep responder if it is not rejected at timer expiration. Consistent with certain aspect of the present disclosure and the TC-10 standard, alternative options can be implemented in the transceiver such as to auto-reject a sleep request at timer expiration, auto-accept immediately or after a shorter time period than the standardized sleep_ack_timer, and this may be configurable via a management interface. If the sleep responder rejects the request, it essentially does nothing and continues normal operation. The sleep initiator will not observe LPS before the sleep_rqst_timer expires, and consider the request as rejected.

These operational aspects for rejection of the sleep request may be seen in FIG. 1A, with the transmit (TX) mode and time-based states of the sleep initiator shown from left to right above the corresponding TX mode and states of the sleep responder (PHY referring to the physical layer or structure such as the transceiver(s) of FIG. 1C).

FIG. 1B illustrates a parallel set of operational aspects for a situation leading to the acceptance of the sleep request, also with the transmit (TX) mode and time-based states of the sleep initiator shown from left to right above the corresponding TX mode and states of the sleep responder. For this situation, the sleep responder responds by sending LPS. The sleep initiator will detect LPS, will know that its link partner (the sleep responder) accepted the sleep request, and will become SILENT. The sleep responder also becomes SILENT after LPS. After a short period of time, referred to as SILENT time (SEND_Z), the transceivers are disabled and go to SLEEP.

As the TC10 specification does not prescribe that the sleep responder should not go SILENT before the sleep initiator becomes SILENT (but specifies the transition to SILENT only based on sent and received LPS), these operational aspects are not only compatible, but waiting for SILENT detection by the sleep responder provides a more reliable handshake and enables further options to stop a running sleep request.

According to the TC10 specification, a transceiver proceeds from SILENT to SLEEP when it also observes SILENT from the link partner. This is fine for the sleep initiator, but for a sleep responder which already waits for SILENT from the initiator before going SILENT, according to an aspect of the present disclosure, a significant improvement may be realized by related aspects of the present disclosure, with a successful sleep request procedure including the proprietary handshake being shown in FIG. 1B. The sleep responder becomes SILENT after detecting SILENT from the sleep initiator. It may obey min_lps_done as LPS needs to be transmitted for at least 128 symbols according to the TC10 standard. However, technically, the sleep responder does not have to wait for min_lps_done, because the sleep initiator becoming SILENT is already confirming that it has detected the LPS response. The sleep initiator transitions from SILENT to SLEEP when it detects that the sleep responder has become SILENT. The sleep responder auto-transitions from SILENT to SLEEP after a parameter referred to as min_silent_time. This parameter, min_silent_time, may be used to ensure that the link will become silent for some time that makes it detectable before a wake-up request may cause a restart of transmission. Note that this is also not specified by the TC10 standard. In such contexts and examples, the above-mentioned operational aspects of the sleep request procedure are compatible with the TC10 standard and may be implemented as modifications to systems/methods in complete compliance with the TC-10 standard or as slight deviations, and importantly, other circuit-based devices, transceivers and the like which are implemented without these modifications are entirely compatible for inter-operable communications (e.g., maintaining compliance with the TC-10 standard without these modifications).

Such aspects of the present disclosure may also be appreciated in understanding that for transceiver-based systems in which the responder does not wait for receiving SILENT before becoming SILENT, the transceivers cannot safely do anything between the start of sending LPS and the expiration of sleep_rqst_timer. This follows because such a transceiver may have to go SILENT anytime when LPS is received from the sleep responder.

Transceivers which are implemented to include such aspects (e.g., as a TC-10 modification) allow for a running sleep request to stop. Consider, for example, when a wake-up event occurs. With this additional handshake, the sleep responder will not go SILENT until it observes the initiator has become SILENT. Therefore, the initiator can send information after the LPS, like data or WUR, which will not get lost. The responder will receive data and detect WUR, even if it already started sending LPS to accept the request. This allows the initiator to stop a running a sleep request if a wake-up event occurs, as long as it has not become SILENT. The wake-up will be communicated via a WUR, and because the wake-up request disqualifies the earlier sleep request, the sleep responder will ignore the sleep request (even if it already started sending LPS to accept the sleep request) and act upon the wake-up request.

Figure 2:
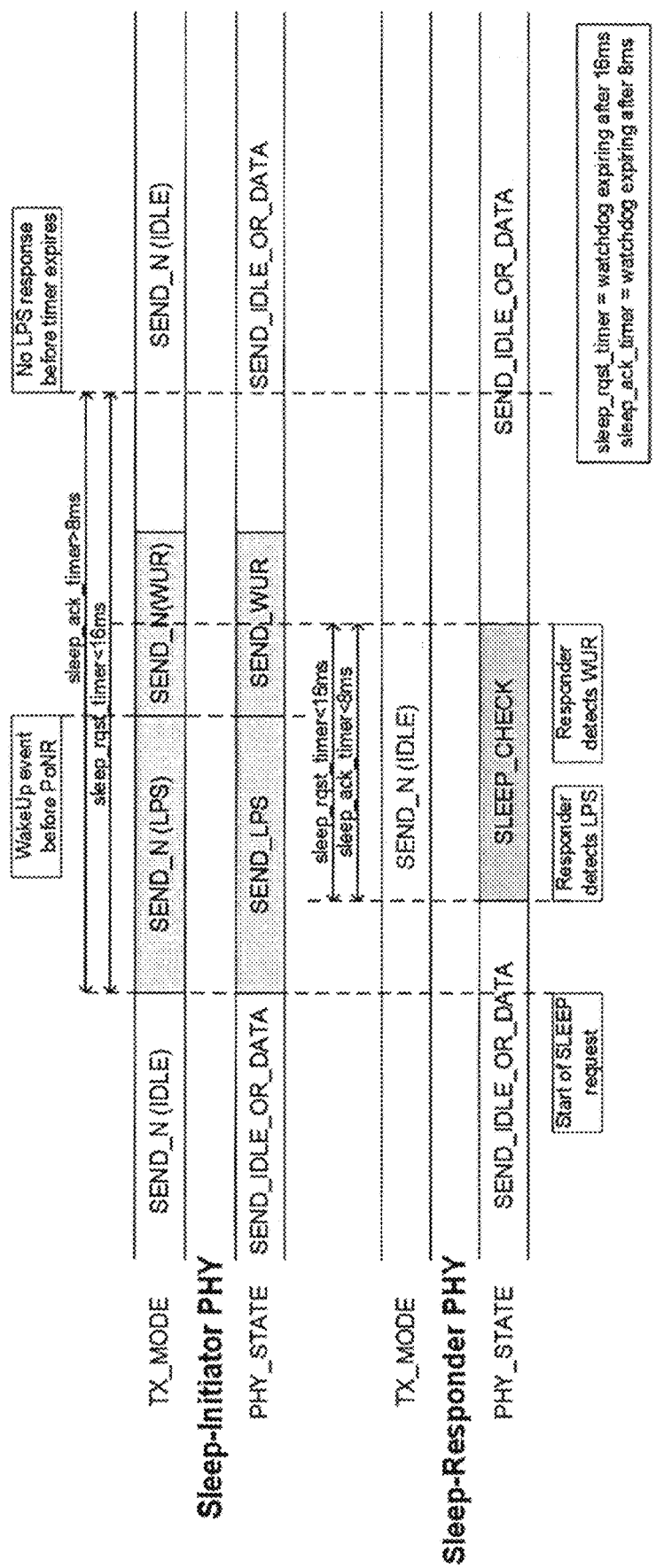
FIG. 2 is a state diagram used to illustrate another situation that may be addressed by using an initiating transceiver and a responding transceiver, also according to certain aspects of the present disclosure.

Certain other aspects of the present disclosure may be appreciated in connection with the state diagrams of FIGS. 2 through 7, as applied for such transceiver-based systems as discussed above for FIGS. 1A, 1B and 1C. FIG. 2 is a state diagram illustrating a sleep request procedure which is successfully aborted by the sleep initiator (and may continue normal operation and/or alert as to the issue). The sleep initiator sends a sleep request by transmitting LPS. At some moment in time a wake-up event occurs in the sleep initiator PHY, before it has observed an LPS response from its link partner. The sleep initiator PHY starts transmitting WUR (another modified IDLE sequence) instead of LPS. In this example, the sleep responder detects the WUR before the SLEEP_CHECK period has ended (e.g., detection of WUR after LPS before accepting the sleep request). This WUR is interpreted as sleep abort and it keeps sending IDLE or DATA. The sleep initiator monitors that the sleep responder keeps transmitting IDLE or DATA, and not LPS, until the sleep_ack_timer expires, which confirms that the sleep request abort was successful. The sleep initiator itself may continue to send WUR or transmit IDLE or DATA after a minimum WUR length until the sleep_ack_timer expires.

Figure 3:
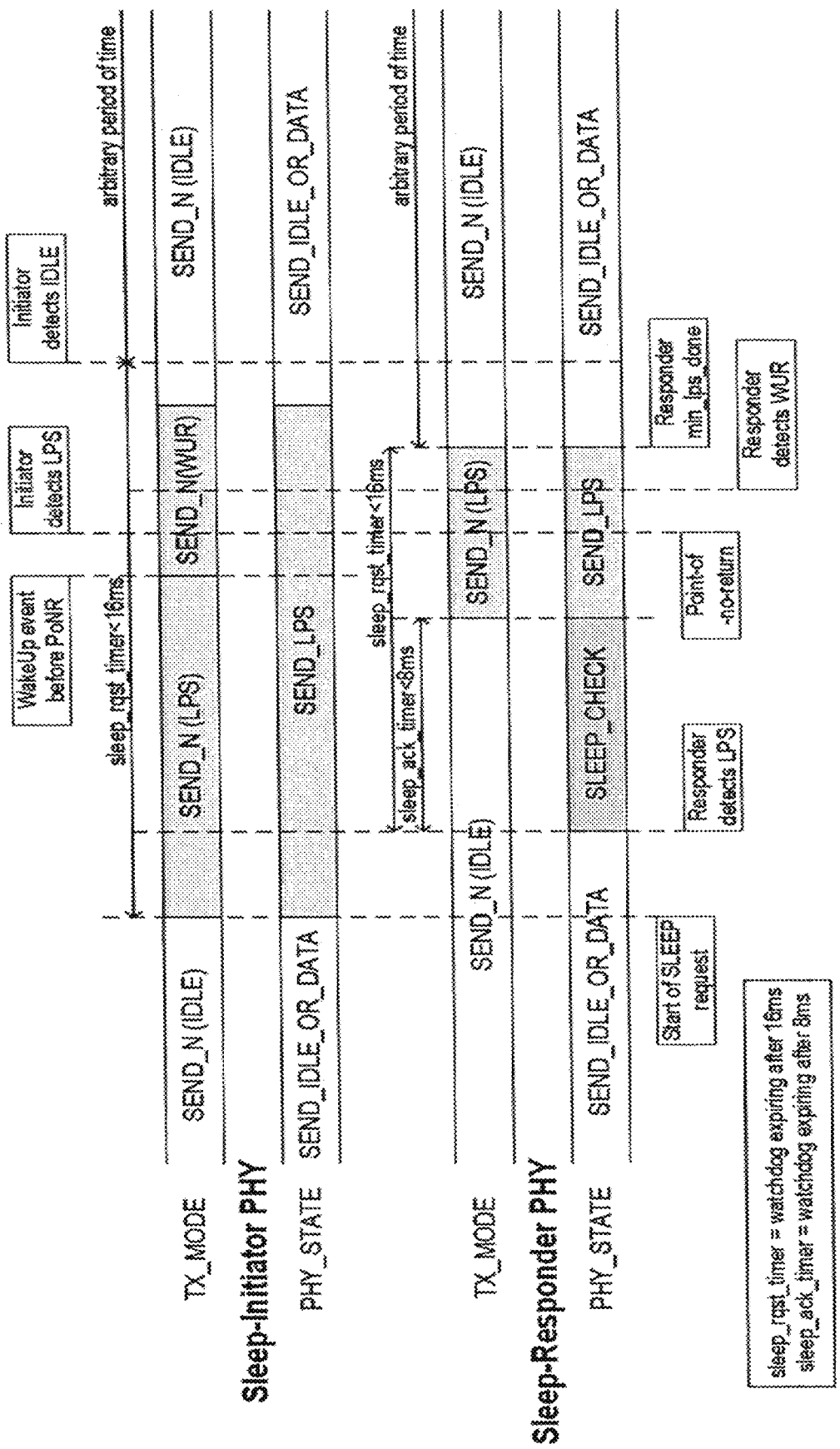
FIG. 3 is another state diagram used to illustrate another situation that may be addressed by using an initiating transceiver and a responding transceiver, also according to certain aspects of the present disclosure.

In FIG. 3, another state diagram shows a sleep request procedure which (as with FIG. 2) is successfully aborted by the sleep initiator. However, in this FIG. 3 example the sleep responder has already accepted the sleep request and started to respond with LPS. However, a wake-up event occurred in the sleep initiator before it detected the LPS response, and it starts to transmit WUR instead of LPS. The sleep responder reverts to IDLE when it detects the WUR. It may wait for min_LPS_done, but does not have to since the detected WUR already determines abort of the sleep request. Note that a sleep responder would normally continue sending LPS until the sleep initiator becomes SILENT (which is an option and not required by the TC10 standard, but this may make the handshake more robust). The sleep initiator reverts to IDLE after the WUR and monitors if the link partner is transmitting IDLE or DATA after the LPS. If that is the case, it confirms that the sleep request was successfully aborted. If the initiator detects that the sleep responder becomes SILENT, it concludes that the sleep abort attempt was unsuccessful, it becomes SILENT too, and both devices enter SLEEP. However, this does not happen if the sleep responder waits for the sleep initiator to become SILENT before it becomes SILENT itself.

Figure 4:
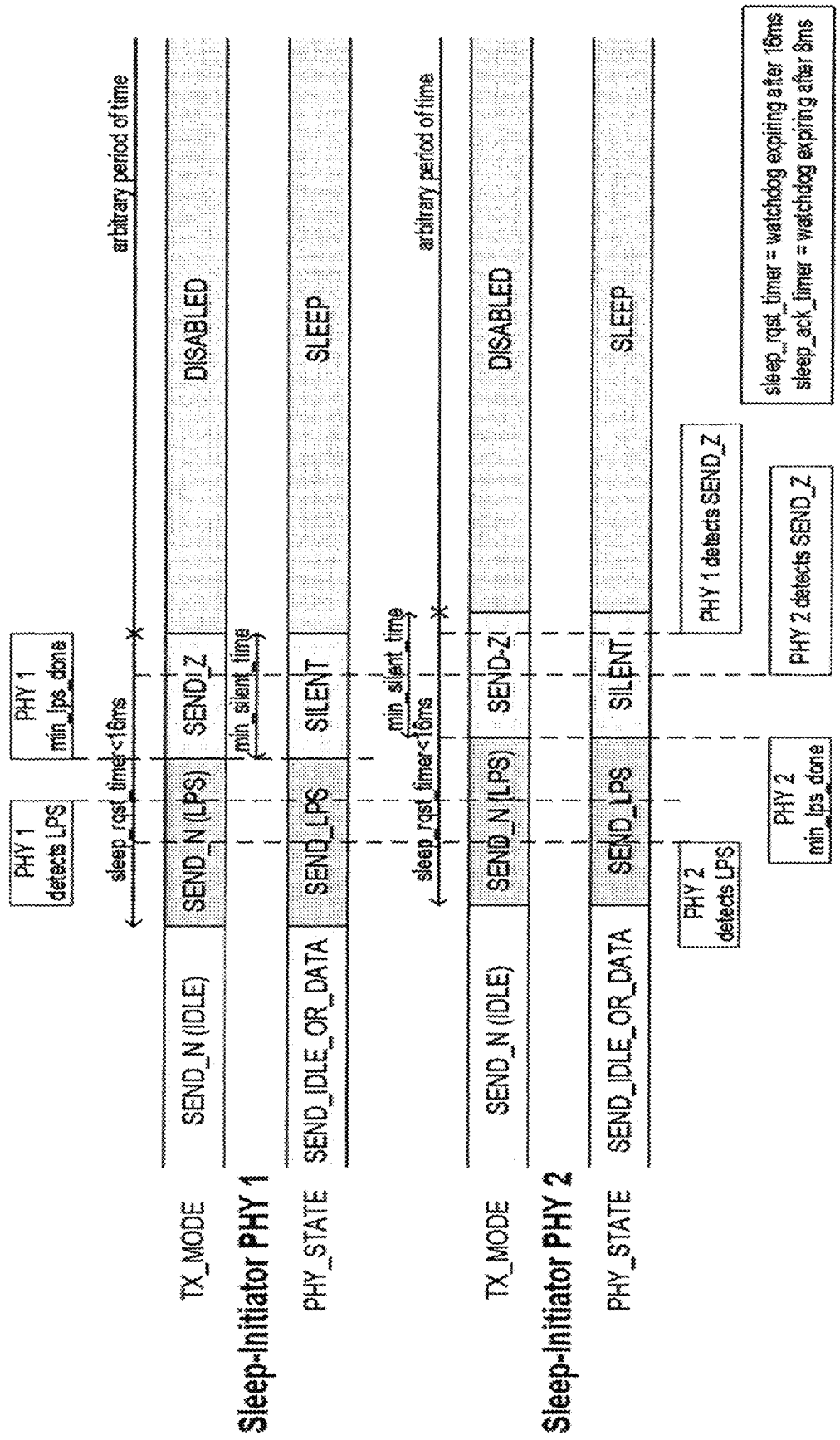
FIG. 4 is a state diagram used to illustrate yet another transceiver-based situation showing use of an initiating transceiver and a responding transceiver according to certain aspects of the present disclosure.

In the example of FIG. 4, it is possible that the two transceivers on a link decide almost simultaneously to launch a sleep request, and in this case each of the involved transceivers considers itself to be a sleep initiator and becomes SILENT after observing an LPS response. This state will happen quickly as both start transmitting LPS almost simultaneously (e.g., one starts transmitting LPS before detecting LPS from the link partner). After some minimum SILENT time and detecting that the link partner is SILENT, both PHYs proceed to SLEEP. The sleep negotiation goes very fast in this case as there is no SLEEP_CHECK period involved. In certain more-specific examples, an attempt to abort a sleep request in this situation will only be successful if the WUR is detected before the end of LPS.

Figure 5:
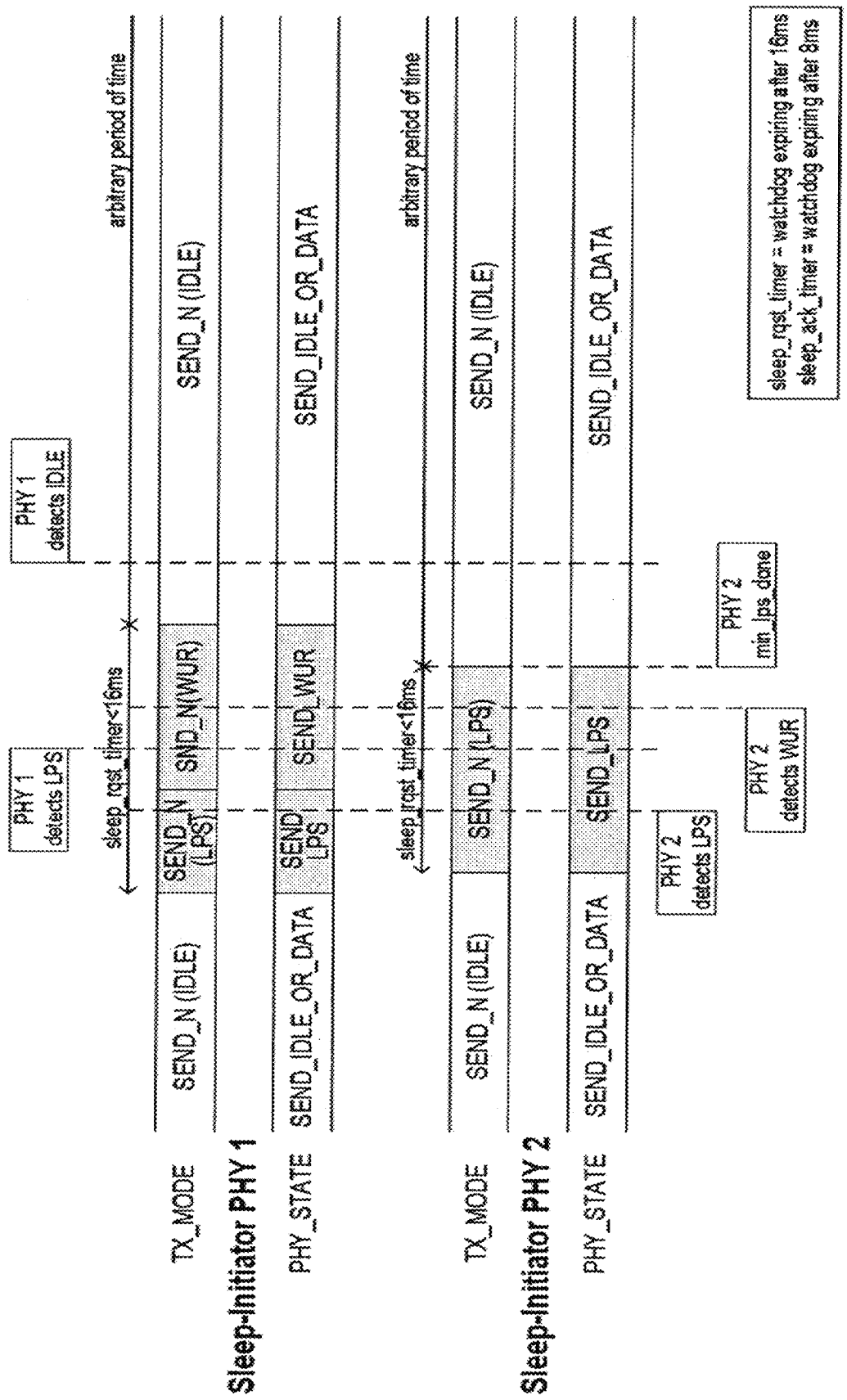
FIG. 5 is a state diagram used to illustrate yet another transceiver-based situation associated with use of linked transceivers, according to certain aspects of the present disclosure.

FIG. 5 shows another example consistent with aspects of the present disclosure for a successful abort of a sleep request conveyed over a link with two transceivers being sleep initiators (using the above context of FIG. 4). As shown in FIG. 4, the first sleep initiator PHY transitions from LPS to WUR as may be triggered by the occurrence of a wake-up event. This WUR is detected by the second sleep initiator PHY before completion of LPS, and therefore reverts to SEND_IDLE_OR_DATA. The first sleep initiator PHY detects that its link partner transition from LPS to IDLE and knows that the sleep request abort was successful.

Figure 6:
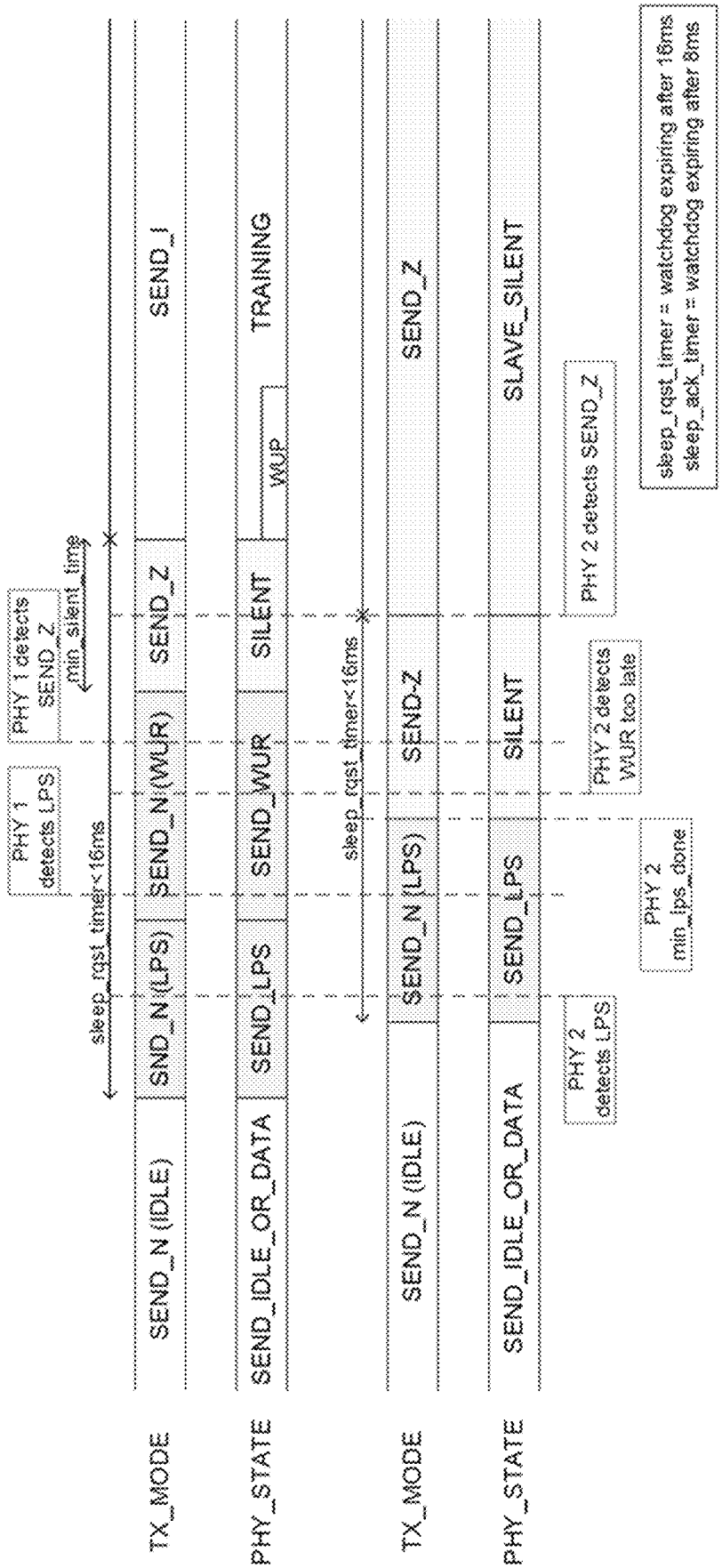
FIG. 6 is a state diagram used to illustrate a further transceiver-based situation associated with use of linked transceivers, according to certain aspects of the present disclosure.
Figure 7:
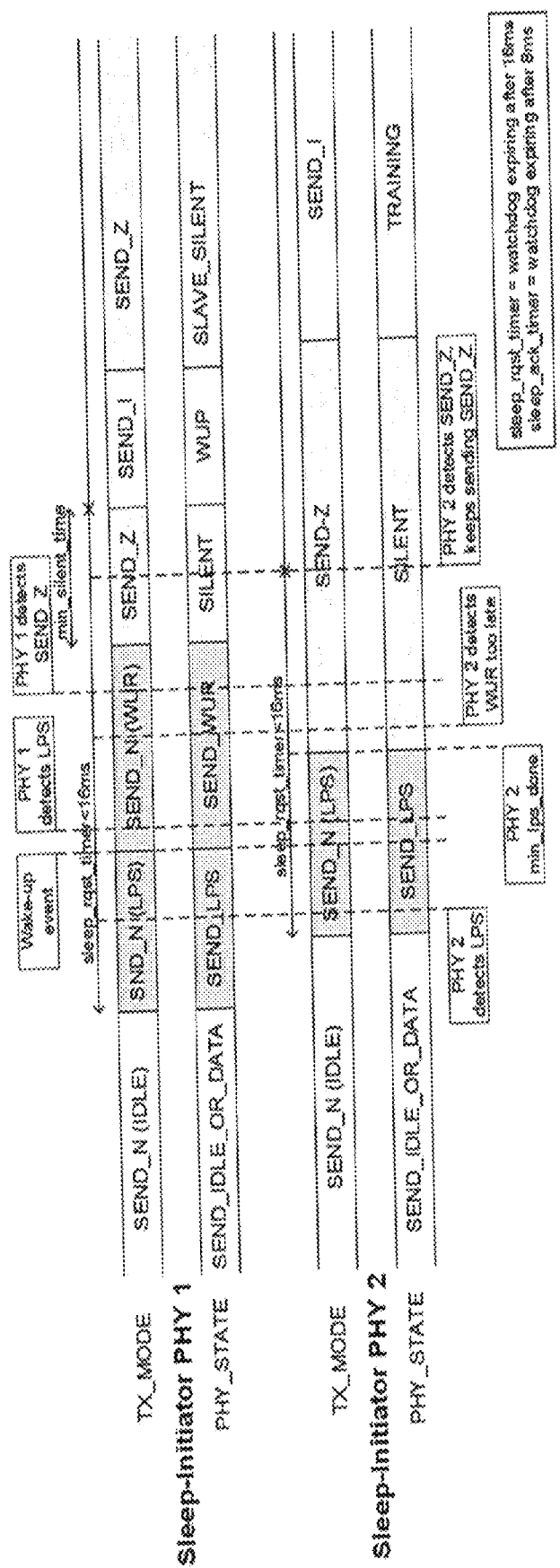
FIG. 7 is a state diagram used to illustrate yet a further transceiver-based situation associated with use of linked transceivers, according to certain aspects of the present disclosure.

Each of FIGS. 6 and 7 show an unsuccessful sleep request abort attempt with two sleep initiators on a link. The WUR is not detected by sleep initiator PHY 2 (physical layer 2) before its (minimum time for) LPS is done. Therefore, sleep initiator PHY 2 becomes SILENT, unaware that the link partner sought to abort the sleep procedure. When sleep initiator PHY 2 detects WUR, it is already too late. Sleep initiator PHY 1 detects that its link partner has become SILENT and concludes that the sleep request abort was unsuccessful. Therefore, sleep initiator PHY 1 also becomes SILENT after the WUR. However, because both transceivers know there is a pending Wake-Up event, they do not go to SLEEP, but a WUP is launched after a min_silent_time, followed by a link training (e.g., as in the 802.3bw 100BASE-T1 standard).

More specifically, FIG. 6 illustrates the case where PHY 1 is master and FIG. 7 illustrates the case where PHY 1 is slave. In both cases, the wake-up event will be quickly communicated, even though the link retraining will take some time until the link is available again for data communication.

The sleep responder that receives a wake-up event may also try to abort a running sleep request if the sleep initiator link partner is not silent yet. In case the sleep responder has not started SEND_LPS, and a wake-up event occurs, the sleep responder sends a WUR and will not send the LPS response anymore. The WUR will implicitly be an indication to the sleep initiator link partner that the sleep request has failed. Note that the sleep responder can also reject the sleep request without sending a WUR, by not sending an LPS response, and continue with SEND_IDLE_OR_DATA. In that case the sleep request will time-out.

A sleep responder may also attempt to abort a sleep request after it has started sending the LPS response, by transitioning to sending WUR. However, the likelihood of successfully aborting the sleep request is limited in that case, because the sleep initiator may become SILENT when it has detected an LPS response and min_lps_done. Only if WUR is started before the minimum LPS length detectable by the sleep initiator occurred, the sleep request procedure can be reliably aborted. However, this is only true for a short time window. Otherwise both transceivers will become SILENT and a WUP will be sent after the min_silent_time. It should be appreciated, however, that the wake-up communication will only be delayed at most by a few milliseconds (ms) in that case.

Accordingly, for such examples as discussed above, there is less benefit in aborting a sleep request after start of SEND_LPS by the sleep responder than in aborting a sleep request after start of SEND_LPS by the sleep initiator. There can be a significant delay in wake-up signaling across the link, if the initiator cannot abort the sleep request. When the initiator cannot abort the sleep request procedure it would be deadlocked for up to 16 ms (e.g., for the current TC-10 wake-sleep specification). Consistent therewith, another example in accordance with the present disclosure might choose only to support the described sleep request abort with WUR after LPS transmitted by the sleep initiator, and not by the sleep responder. In yet other examples in accordance with the present disclosure, implementations might also choose to support the described sleep request abort by WUR after LPS if transmitted by sleep initiator and/or responder.

Such aspects of the present disclosure are believed to be useful with the TC10 standard and other protocols to specify communication-based protocols for functionality that makes use of Ethernet sleep and/or wake-up operations and including support for the following exemplary features: fast wake-up and wake-up requests (and related link-training) to support local and global requests; and controlled link shutdown and hibernation associated with selected parts of a transceiver or network.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, processor, converter, controller, and/or other circuit-type depictions (e.g., reference numerals/blocks in FIGS. 1 and 2 depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown and discussed in the present disclosure. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described above is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not necessarily depart from the true spirit and scope of various aspects of the disclosure, including aspects set forth in the claims.

What is claimed is:

1. A communication system comprising:
a first transceiver and a second transceiver being communicatively coupled with one another via a communication link,
the first transceiver to initiate a request over the link to the second transceiver to transition to a power state, and
the second transceiver to, in response to receiving to the request, provide an acknowledgement to the request which is not acceptance of the request, monitor the link to detect whether any further signaling on the link by the first transceiver indicates that the first transceiver transitioned to the power state after the second transceiver provided the acknowledgment, and accept the request after providing the acknowledgement and after determining that the first transceiver transitions to the power state based on the any further signaling indicating that the first transceiver transitioned to the power state.

2. The communication system of claim 1, further including a communication network having a handshake protocol used by a plurality of transceivers including the first transceiver and the second transceiver, wherein the second transceiver is to accept the request in response to said any further signaling being in compliance with the handshake protocol, and wherein in one mode of system operation, the initiated request is a request to transition respective states of the first and second transceivers for alignment, and said any further signaling indicates that the first transceiver has transitioned to the power state for the alignment, and wherein the second transceiver is to detect said whether any further signaling on the link by the first transceiver indicating to accept the request, or to abort the request.

3. The communication system of claim 2, wherein the second transceiver is further to accept in response to assessing that said any further signaling is in compliance with the handshake protocol, and wherein accepting the request is to validate proceeding with an activity involving the communication network.

4. The communication system of claim 3, further including a point-to-point channel that includes the link, and wherein the activity involving the communication network is to cause a change in power-level operation for circuitry in the communication network.

5. The communication system of claim 1, wherein the second transceiver is to accept the request in response to said any further signaling being in compliance with a handshake protocol to cause a change in between power-consumption modes for circuitry associated with at least the second transceiver, in response to said any further signaling being used to indicate no further instructions measured relative to the request.

6. The communication system of claim 1, wherein the second transceiver is to accept the request in response to said any further signaling being in compliance with a handshake protocol, and wherein the first transceiver is to elect whether to use said any further signaling as to alter the request to the second transceiver.

7. The communication system of claim 6, wherein said any further signaling is to indicate an abort of the request to the second transceiver.

8. The communication system of claim 1, wherein the first transceiver is configured to abort the request by sending another message via the link until the second transceiver has accepted the request.

9. A communication system according to claim 1, wherein the request is related to changing circuitry, associated with the first and second transceivers, to change between two modes of operation corresponding to a lower power-consumption state and higher power-consumption state in which more power is consumed by the circuitry than the lower power-consumption state.

10. A communication system according to claim 1, wherein the request is an initial request which is aborted by sending another request and while the link is in an operational mode, the operational mode being indicated in a handshake protocol used by the first and second transceivers in conveying the request over the link.

11. A communication system according to claim 1, wherein the request is an initial request which is aborted by sending another request, wherein the initial request is a sleep request and the other request is from the first transceiver, to keep the link in the operational mode.

12. A communication system according to claim 1, wherein the request is pursuant to a handshake protocol which is compatible or interoperable with at least one handshake set forth in a specification corresponding to OPEN TC-10 wake-sleep specification, for which the request may correspond to either of low power signaling (LPS) or wake-up request (WUR).

13. A communication system according to claim 1, wherein the request is an initial request which is followed by another request, wherein the initial request is one of a wake-up request and a sleep request, and the other request is for aborting the initial request, and wherein one of the first and second transceivers is to monitor the link to assess whether said any further signaling occurring after the other request indicates that the other request was successful in aborting the initial request.

14. A communication system according to claim 1, wherein the request is a sleep request, which is followed by a wake-up request sent via said any further signaling to abort the initial sleep request.

15. A communication system according to claim 1, wherein the request is a sleep request, and the other request is a wake-up request sent as said any further signaling on the link, thereby using the link to abort the initial sleep request.

16. A communication system according to claim 1, wherein the second transceiver interprets said any further signaling on the link as an indication to abort the request sent by the first transceiver.

17. The communication system of claim 1, wherein the acknowledgement of the request by the second transceiver comprises a low power signaling provided to the first transceiver; wherein the acceptance of the request by the other transceiver comprises transitioning from providing the low power signaling to providing zero signaling; and wherein the power state is silence.

18. An apparatus for use in a communication system having a request-initiating transceiver being communicatively coupled for communication via a link, the apparatus comprising:
    another transceiver to receive a request to transition to a power state via the link from the request initiating transceiver; and
    in response to receiving to the request, to provide an acknowledgement to the request which is not acceptance of the request, to monitor the link to detect if any further signaling on the link from the request-initiating transceiver indicates that the first transceiver transitioned to the power state after the other transceiver provided the acknowledgment, and to accept the request after providing the acknowledgement and after determining that the first transceiver transitions to the power state based on the any further signaling indicating that the first transceiver transitioned to the power state.

19. The apparatus of claim 18, further including a communication network including a plurality of circuit nodes configured for communicating data in an automobile, wherein the other transceiver is part of one of the plurality of circuit nodes and the request-initiating transceiver is part of another of the plurality of circuit nodes, and wherein the other transceiver is also to interpret said any further signaling as an indication that the received request should be aborted.

20. The apparatus of claim 18, wherein the acknowledgement of the request by other transceiver comprises a low power signaling provided to the request-initiating transceiver; wherein the acceptance of the request by the other transceiver comprises transitioning from providing the low power signaling to providing zero signaling; and wherein the power state is silence.

21. A method for use in a communication system having a request-initiating transceiver being communicatively coupled for communication via a link, the method comprising:
- at another transceiver in the communication system, receiving a request to transition to a power state via the link from the request initiating transceiver; and
- in response to receiving to the request, providing an acknowledgement to the request which is not acceptance of the request, monitoring the link to detect if any further signaling on the link from the request-initiating transceiver indicates for the other transceiver to accept the request and that the first transceiver transitioned to the power state after the other transceiver provided the acknowledgment, and accepting the request after providing the acknowledgement and after determining that the first transceiver transitions to the power state based on the any further signaling indicating that the first transceiver transitioned to the power state.

22. The method of claim 21, wherein the other transceiver is to accept the request in response to said any further signaling being in compliance with a handshake protocol, and to interpret said any further signaling of a certain type in accordance with the handshake protocol as a request to abort the request from the request initiating transceiver.

23. The method of claim 21, wherein the acknowledgement by the other transceiver is a low power signaling provided to the request-initiating transceiver; wherein the acceptance of the request by the other transceiver comprises transitioning from providing the low power signaling to providing zero signaling; and wherein the power state is silence.

* * * * *